United States Patent
Brackett et al.

(10) Patent No.: US 7,151,435 B2
(45) Date of Patent: Dec. 19, 2006

(54) METHOD AND APPARATUS FOR IDENTIFYING A PATIENT

(75) Inventors: C. Cameron Brackett, Naperville, IL (US); Steven L. Fors, Chicago, IL (US); Mark M. Morita, Arlington Heights, IL (US); John F. Moehrke, Oostburg, WI (US); Steven P. Roehm, Waukesha, WI (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 228 days.

(21) Appl. No.: 10/304,538

(22) Filed: Nov. 26, 2002

(65) Prior Publication Data

US 2004/0100361 A1   May 27, 2004

(51) Int. Cl.
    G05B 19/00    (2006.01)
    G06F 7/04     (2006.01)
    G08B 29/00    (2006.01)
    H04B 1/00     (2006.01)
    H04L 9/32     (2006.01)

(52) U.S. Cl. .................... 340/5.74; 340/5.62; 340/7.23

(58) Field of Classification Search ............... 340/5.74, 340/5.62, 7.23, 7.39, 7.48, 7.51–7.52, 7.55, 340/825.34, 825.19, 825.36, 825.37, 825.4; 235/487–488, 380; 600/300, 508, 509
    See application file for complete search history.

(56) References Cited

U.S. PATENT DOCUMENTS

| 4,510,495 | A | | 4/1985 | Sigrimis et al. |
| 4,618,861 | A | | 10/1986 | Gettens et al. |
| 5,150,310 | A | | 9/1992 | Greenspun et al. |
| 5,204,670 | A | * | 4/1993 | Stinton ...................... 340/10.5 |
| 5,335,664 | A | * | 8/1994 | Nagashima ................. 600/508 |
| 5,353,011 | A | | 10/1994 | Wheeler et al. |
| 5,381,137 | A | | 1/1995 | Ghaem et al. |
| 5,417,222 | A | * | 5/1995 | Dempsey et al. ........... 600/509 |
| 5,552,772 | A | | 9/1996 | Janky et al. |
| 5,568,119 | A | | 10/1996 | Schipper et al. |
| 5,842,118 | A | | 11/1998 | Wood, Jr. |
| 5,877,675 | A | * | 3/1999 | Rebstock et al. ...... 340/286.07 |
| 5,920,261 | A | | 7/1999 | Hughes et al. |
| 5,977,913 | A | | 11/1999 | Christ |
| 6,013,949 | A | | 1/2000 | Tuttle |
| 6,023,610 | A | | 2/2000 | Wood, Jr. |
| 6,031,459 | A | | 2/2000 | Lake |
| 6,093,146 | A | * | 7/2000 | Filangeri ..................... 600/300 |

(Continued)

*Primary Examiner*—Wendy R. Garber
*Assistant Examiner*—Nam Nguyen
(74) *Attorney, Agent, or Firm*—Andrus, Sceales, Starke & Sawall, LLP

(57) ABSTRACT

A method for updating information about a subject of interest is disclosed. The method comprises assigning the subject a unique signal which signal is physically associated with the subject, identifying the unique signal, and displaying information related to the subject assigned to the unique signal soon after the signal is identified. The method is preferably used in a hospital setting. Also disclosed is a device, a system, and a control program for use in updating information. The device comprises a control logic responsive to an external stimulus, a wireless signal detection unit, and a display unit that displays information about a subject that has been identified. The control program is used with a wireless detector and comprises a feature that controls display, a feature that identifies a signal associated with a subject, and a feature that displays information in response to the identification feature. Security features can also be incorporated.

60 Claims, 4 Drawing Sheets

U.S. PATENT DOCUMENTS

| | | |
|---|---|---|
| 6,150,921 A | 11/2000 | Werb et al. |
| 6,198,394 B1 * | 3/2001 | Jacobsen et al. ......... 340/573.1 |
| 6,326,889 B1 | 12/2001 | Van Horn et al. |
| 6,356,230 B1 | 3/2002 | Greef et al. |
| 6,380,845 B1 | 4/2002 | Tuttle |
| 6,694,180 B1 * | 2/2004 | Boesen ....................... 600/547 |
| 6,749,566 B1 * | 6/2004 | Russ .......................... 600/300 |

* cited by examiner

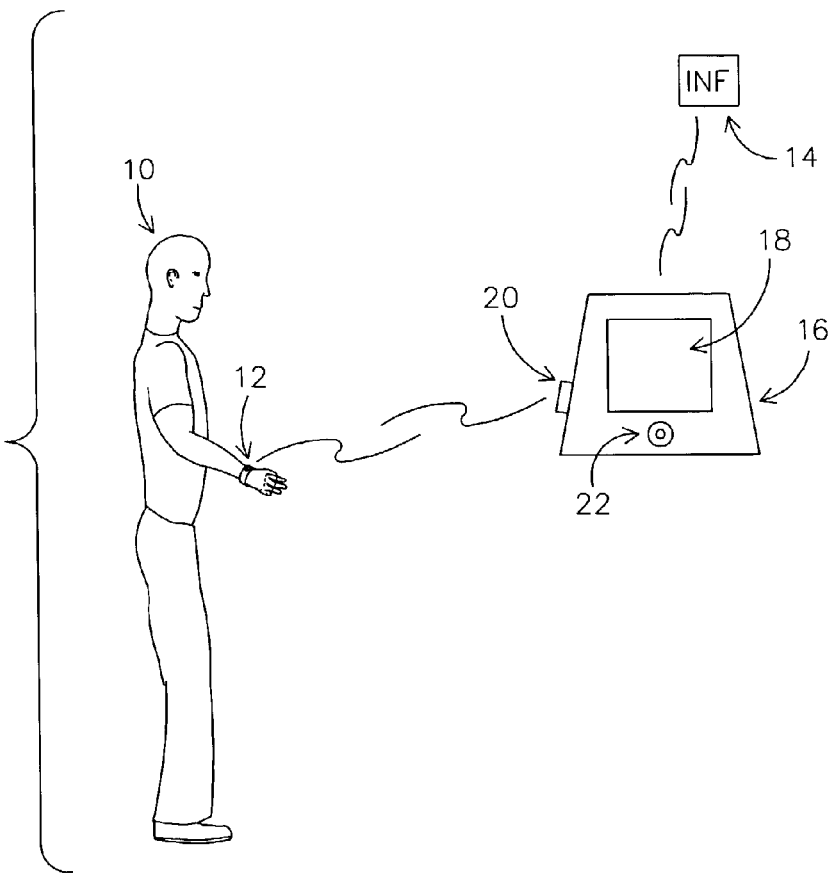
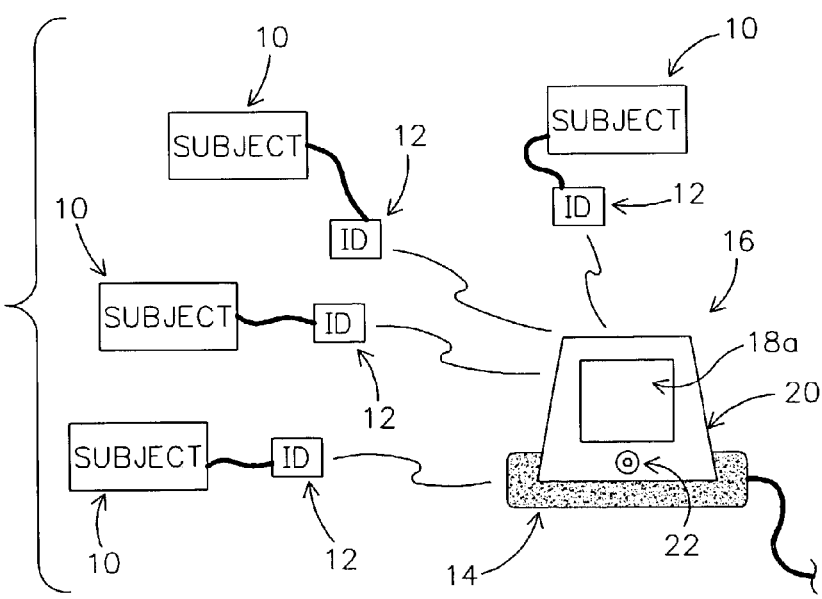

METHOD AND APPARATUS FOR IDENTIFYING A PATIENT

FIELD OF THE INVENTION

The invention generally relates to identifying a subject of interest using wireless technology.

BACKGROUND OF THE INVENTION

Today, patients are identified in a hospital using ID tags that must be visible to a person or machine in order to identify the patient. Such systems can involve waking and/or manipulating patients. A system that can identify patients without needing visual contact is desirable.

Also, many patient identification systems involve placing potentially important patient information (such as a patient's name or identification number) in plain sight where anyone can see it. Some people may misuse information displayed in this manner. A system of identifying patients without placing important patient information in plain sight is also desirable.

In addition, physicians today have to either carry around a paper chart or sit down at various computers to access data they need to work with a patient. With the widespread use of intranets, and even the internet, it is now possible to have a single workstation that provides access to all of this data. Current systems do not effectively and conveniently allow a physician or other hospital staff to quickly and conveniently access patient information. An information system that allows the user to access multiple pieces of data wirelessly on a single device is preferable. Further, a device that makes accessing patient information more convenient is needed.

Also, many governmental entities are passing stricter legislation regulating confidentiality of medical records. One part of many of these laws is regulating access to patient records, including by staff at hospitals where some members of the staff are not treating the patient. It would be desirable to have a patient record display system that could regulate access to patient records to prevent unauthorized people from seeing the records.

Further, typical record display systems organize data in the same manner for every person who views the information. This may be inconvenient for some users because the information they are most interested in is buried in the record, or is divided between multiple areas of the record that the user must flip between. A system that is able to provide a user access to information that is most valuable to the user would be helpful in increasing efficiency and workflow.

Further still, different information may be more relevant to a user at different times. If a doctor sends a patient to get a test done, the doctor would likely be primarily interested in the lab results and the other information that is related to the lab results and reasons for running the test. Thus, a system that differentially displays information depending on what is most important at the time is desirable.

BRIEF SUMMARY OF THE INVENTION

One embodiment is directed to a method for identifying a health care patient. The method comprises assigning the patient a unique signal; wirelessly identifying the unique signal assigned to the patient; and using the identification of the unique signal. Common uses include displaying information relating to the patient and associating the patient with tests to be run.

An additional embodiment is directed to a method for updating information about a subject of interest. The method comprises assigning the subject of interest a unique signal which signal is physically associated with the subject of interest; identifying the unique signal; and displaying information representative of the subject of interest assigned to the unique signal soon after the unique signal is identified.

Another method is directed to supplying information about a patient to a health care worker. The method comprises wirelessly identifying at least one unique signal associated with a patient and displaying information relating to the patient based on the identification of the signal.

An additional embodiment is directed to a method for identifying a health care patient. The method comprises assigning the patient a unique identifier; wirelessly and electronically identifying the unique identifier assigned to the patient; and using the identification of the unique identifier. Wirelessly and electronically identifying the unique identifier preferably includes identifying a unique signal. The unique signal is preferably a radio frequency signal.

Another embodiment is directed to a portable device for displaying information relating to a subject of interest having a unique signal associated therewith. The portable device comprises a control logic that generates a control signal in response to a user actuated stimulus; a wireless signal detection unit capable of detecting the unique signal; and a display unit capable of displaying information in response to the control signal, the information displayed depending on the signal detected by the wireless signal detection unit.

A further embodiment is directed to a system for displaying information relating to a subject of interest comprising a detecting device and at least one information device. The detecting device comprises a portion for detecting a unique signal; a control that generates a control signal in response to an external stimulus; and a portion for displaying information in response to the control signal. The information device is associated with a unique signal that can be detected by the wireless signal detection device.

An additional embodiment is directed to a system for identifying a health care patient in a health care facility. The system comprises an identification device that produces a unique signal; a wireless signal detection unit that can detect the unique signal; and an assigning unit that assigns the unique signal to the patient. The unique signal is preferably a radio frequency signal and is preferably a passive signal.

Another embodiment provides a system for identifying a health care patient in a health care facility. The system comprises an identification device that produces a unique signal and a wireless signal detection unit that can detect the unique signal. The system also comprises an assigning unit that assigns the unique signal to the patient. The assigning unit is preferably a computer with software that allows the unique signal to be associated with the patient by associating the unique signal with some other patient identifier used by the health care facility to identify the patient.

Yet another embodiment is directed to a control program for use with a wireless signal detection device that detects a signal physically associated with a subject of interest. The control program comprises a control feature, responsive to a user, that signifies information associated with signals should be displayed. The control program also comprises an identification feature that identifies the signal associated with the subject of interest and identifies that the signal is associated with the subject of interest. Additionally, the control program comprises a display feature that displays information in response to the identification feature.

BRIEF DESCRIPTION OF THE DRAWINGS

FIG. 1 is a schematic diagram showing the structure of a system for use in effectively and securely viewing and updating patient information according to one embodiment of the invention where the information supplier is wireless;

FIG. 3 is a schematic diagram showing the structure of a system according to one embodiment of the invention where the display can be a screen, where the connection is a data connection, where the information device is not strapped to the subject of interest, and where the monitoring unit is integral with the unit housing the display;

DETAILED DESCRIPTION OF THE PREFERRED EMBODIMENTS

Figure 2A:
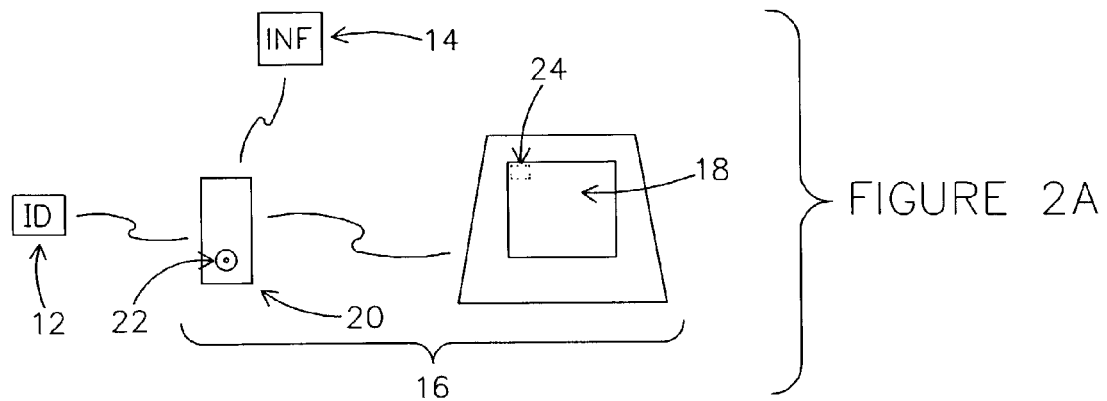
FIGS. 2A–D are schematic diagrams showing other systems which are embodiments of the current invention where the detecting device is comprised of two portions.

FIG. 1 shows a system according to one preferred embodiment of the present invention. FIG. 1 shows an identification device 12 physically associated with the subject of interest 10. FIG. 1 also shows an information supplier 14 and a viewing device 16. The viewing device 16 has a wireless detection unit 20, a display 18, and a user input device 22.

The subject of interest 10 is physically associated with an identification device 12. The identification device 12 contains a unique identification signal that can be used to identify the subject of interest 10. FIG. 1 shows the identification device 12 as a wristband mounted around the subject of interest's 10 wrist. The identification device 12 could be physically associated with the subject of interest 10 in many other manners. For instance, the identification device 12 could be coupled to the bed of the subject of interest 10, or to the room of the subject of interest 10. Also, the identification device 12 could be adhesively connected to a crate or a vehicle. In each of the above examples, the identification device is located at or near the subject of interest 10.

The unique signal of the identification device is assigned to the subject of interest 10 by an assigning unit. Preferably, the assigning unit is a software program that inputs the unique signal and assigns the signal to a subject of interest 10. This can be done by having a detector scan the identification device while a patient record is displayed in the program. The program would then know which signal to assign to which subject of interest 10. The signal will likely get assigned to the subject of interest 10 by assigning the unique signal to a patient identification already used by a health care facility to identify the subject of interest 10.

A user actuates a user input device 22 such as a button, a switch, a trigger, etc. In response to the actuation of the user input device 22, control logic sends a control signal that facilitates display of information. The control signal preferably prompts the wireless detection unit 20 to detect unique signals broadcast by the identification device 12. The control signal may alternatively prompt identification of signals detected or prompt signals identified to be displayed. The control logic can also be prompted by other stimulus, such as an automated signal, but is preferably prompted by a user actuated stimulus. Examples of user actuated stimulus include the user pressing a button/switch, the user selecting a control option (such as on a screen), actuating a touch sensitive area of a display screen, or any other action taken by the user that is intended to prompt the control logic.

Wireless detection unit 20 detects identification signals that are in the proximity of the wireless detection unit 20. The identification signals that are detected are then identified. The identification signals may either be identified within the viewing device 16 or may be sent to a central network through the information supplier 14 where they are identified, and the results are supplied back to the viewing device 16.

Display of information relating to the subject of interest 10 associated with the identified signal is then facilitated. The information may either appear on the display 18, or may appear after a further user control (for example the subject of interest's 10 name appears on a screen which the doctor then selects). Preferably, the information is displayed if only one subject of interest 10 is identified, and a list of possible subjects of interest 10 are identified if more than one subject of interest 10 is identified.

More preferably, the viewing device 16 can be associated with a particular user (i.e. by entering a password or by assigning the viewing device 16 to a particular user). When the viewing device 16 is associated with a particular user, only subjects of interest 10 associated with the user will be displayed on the display 18. In a hospital setting, this allows for greater patient confidentiality by more tightly regulating access to patient records. Only hospital staff associated with the patient would get access to the records. Further, a user's access can be limited to only that information which the user needs to treat the patient and not other information. Also, the information to be displayed to a user can be regulated based on who the user is and/or the user's job function.

This optional limited viewing feature can facilitate compliance with medical confidentiality laws established by federal, state, local, or other jurisdictional authorities: the technology itself can aid a health care facility to limit access to confidential information. For instance, a health care facility can keep track of a patient who only gives limited consent for treatment by only allowing access to the patient's records to limited individuals. Further, a health care worker who is in a position to do an act that was not consented to may receive a red flag when viewing the records, but workers who have no concerns may be allowed free access.

Access to data can be regulated on a person by person basis, team by team basis, a division by division basis, etc. The information may also be regulated in numerous other manners that may be desired.

Display of information is typically accomplished soon after the unique signal is identified in response to the signal being identified. Other steps may be performed between identification of the unique signal and display of information relating to the subject of interest 10 (such as a further user input, a search of the records, etc.). The viewing device 16 usually displays information relatively quickly, such as within a minute, but, depending on the size of databases to be searched and speed of equipment, additional time may be needed.

Associating the viewing device 16 with a particular user also allows the form of the data to appear in a more convenient manner. Different users may find different types of information to be helpful. For instance, in a hospital setting, a technician running a test may need to know a subject of interest's 10 height, weight, drugs taken on a regular basis, referring physician, and other information; a nurse may be more interested in knowing who the primary physician is, who the treating physician is, what drugs have been prescribed and in what dose on what interval, other people assigned to the patient, and any special requests made by the patient; and other staff (such as administrators and social workers) may prefer to see how long a subject of interest 10 has been admitted, the subject of interest's 10 contact information, the subject of interest's 10 contact person, the procedures done on the subject of interest 10, and the insurance information of the subject of interest 10. Also, doctor X may prefer to look at particular information first, while doctor Y may prefer to see other information first. For different users, the information may be displayed in a different format, making the most useful information for the particular user (by position or by person) appear first or more prominently and making other information appear later or less prominently.

The display may also be configured to display different information at different times depending on what is needed at the time. Different information may be more relevant to a user at different times. If a doctor sends a subject of interest 10 to get a test done, the doctor would likely be primarily interested in the lab results and the other information that is related to the lab results and reasons for running the test. The display could also give an 'alarm' when a doctor reads through a patient record to indicate that a given event, such as completed lab results or expert review of an x-ray, has occurred. For a nurse, an alarm might indicate that a prescription to be administered by the nurse has been sent from the pharmacy and has arrived or will be arriving soon. The alarm may be by way of a different text color, an audible signal, a visual signal such as an icon, a flashing display, or a flashing light on the display device, or any other manner designed to get attention or show an occurrence of an event. The alarm might also include a link to the information relating to the alarm.

The information to be displayed is information associated with the subject of interest 10. For instance, if the subject of interest 10 is a hospital patient, the information to be displayed could be patient data, i.e. information relating to the patient as a hospital patient. Some examples of patient data include name, age, height, weight, symptoms, medical history and medical records of that history, insurance information, medical records from the current visit, medical charts, medical images, waveforms, lab results, treating physician, nurse or nurse staff, regular physician, and real-time patient monitoring results (i.e., monitoring that is ongoing or has occurred that regularly monitors certain criteria—examples being an EKG or IV drip).

The viewing device 16 may, for example, be a personal digital assistant (PDA), a pocket personal computer (Pocket PC), a tablet personal computer (Tablet PC), a phone, a pager, or other suitable device.

The identification device 12 could also be hardened against water, heat, and chemicals to allow it to be more durable. The identification device 12 preferably uses a passive signal. A passive signal allows the identification device to be used without requiring a power source. If a passive signal is used, the wireless detection unit 20 would interrogate the identification device 12. Passive signals using a radio frequency signal generally can be interrogated from distances of 10 centimeters to 3 meters. Larger ranges are possible but not preferred because the larger the range, the larger the number of signals that will likely be detected.

FIGS. 2A–2D show different embodiments of the viewing device 16. Also, the various functions of the viewing device 16 (detection, control, allowing identification, and display) can be divided between separate devices. For instance, as seen in FIG. 2A, the viewing device 16 may include a wireless detection unit 20 that is separate from the display 18 and that communicates with the display 18 wirelessly. As seen in FIG. 2A, a user input device 22 is coupled to the wireless detection unit 20. The user may actuate the user input device 22 to prompt the control logic. Alternatively, the device containing the display 18 has a control option 24 which can be actuated by the user to prompt the control signal. The wireless detection unit 20 interacts with the information supplier 14 to identify the unique signals and to obtain information relating to the subject of interest 10.

Figure 2B:
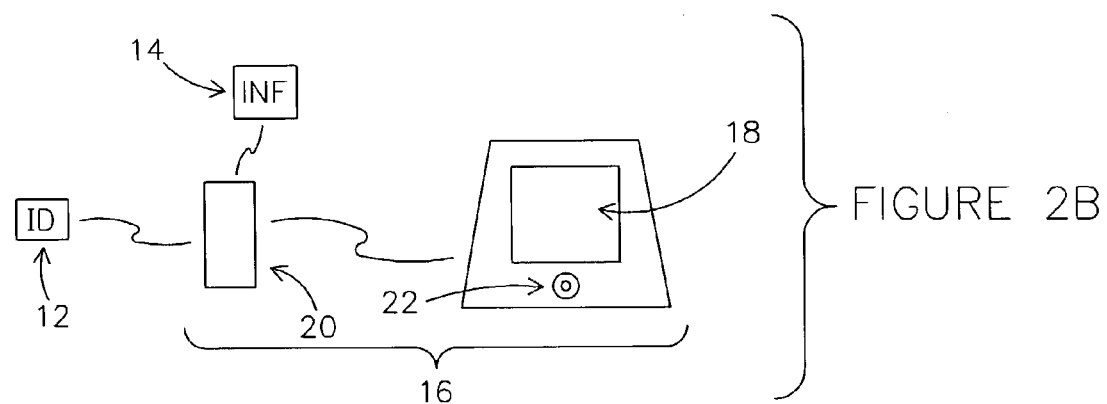

As seen in FIG. 2B, the device containing the display also has a user input device 22 that can be actuated by the user to prompt the control logic. Both the device containing the display 18 and the wireless detection unit 20 can communicate with the information supplier 14 to identify the signals and to obtain information.

Figure 2C:
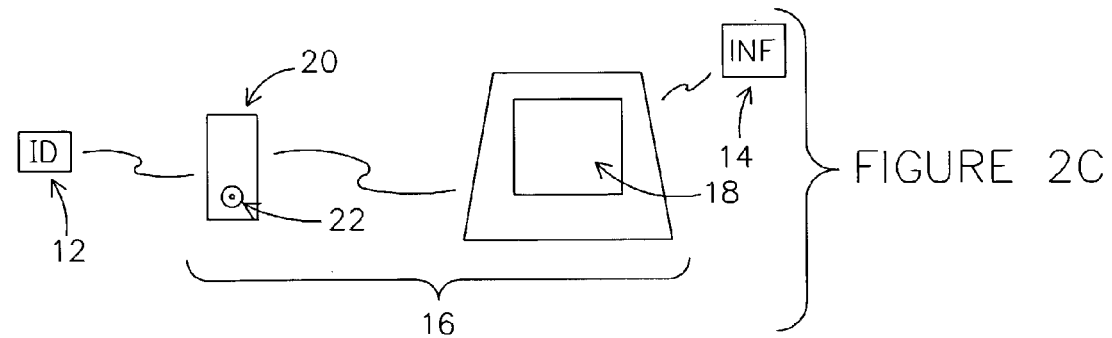

As seen in FIG. 2C the wireless detection unit 20 is coupled to the user input device 22 that can be actuated by the user to prompt the viewing device. Once signals are detected, wireless detection unit 20 identifies the signal. The identity of the signal is then sent to the device containing the display 18 which communicates with the information supplier 14 to obtain information.

Figure 2D:
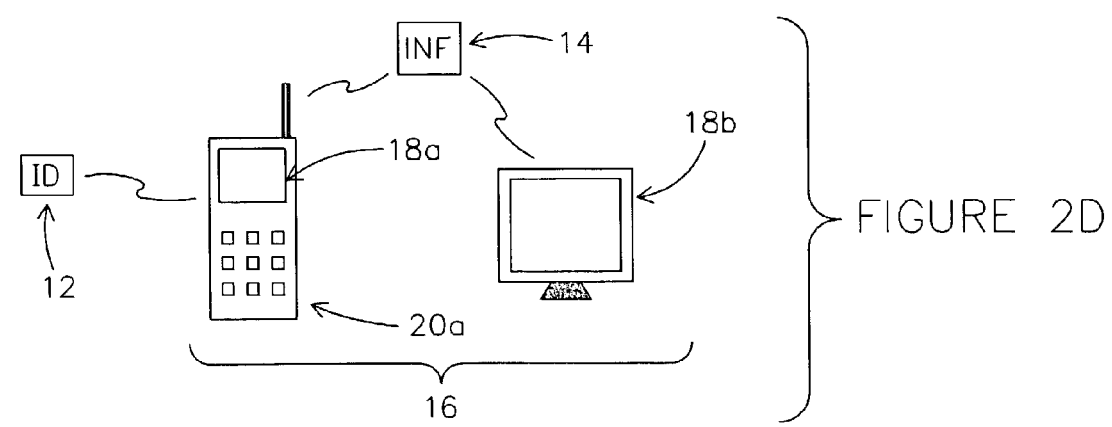

As seen in FIG. 2D, the wireless detection unit 20a is a portable phone. The portable phone 20a detects signals from the identification device 12 in response to a control action by the user. The control action could be actuating a key on the keypad, or actuating (selecting) a menu option. The phone 20a communicates with an information supplier 14 to identify the detected signals. A user can then view information on a monitor 18b via information supplier 14. Alternatively, the screen 18a of the portable phone could act as the display 18.

FIG. 3 shows an embodiment in which the display 18 is a screen 18a. FIG. 3 also shows the information supplier 14 as a data connection. Further, a plurality of information devices 12 are associated with a plurality of subjects of interest 10. The viewing device 16 also has a user actuated user input device 22. The wireless detection unit 20 is an integrated part of the viewing device 16. Preferably, the wireless detection unit 20 is a card that is integrated into the viewing device 16. The display 18, could also be a non-screen display such as an audible indication, or a printout from a printer.

Figure 4:
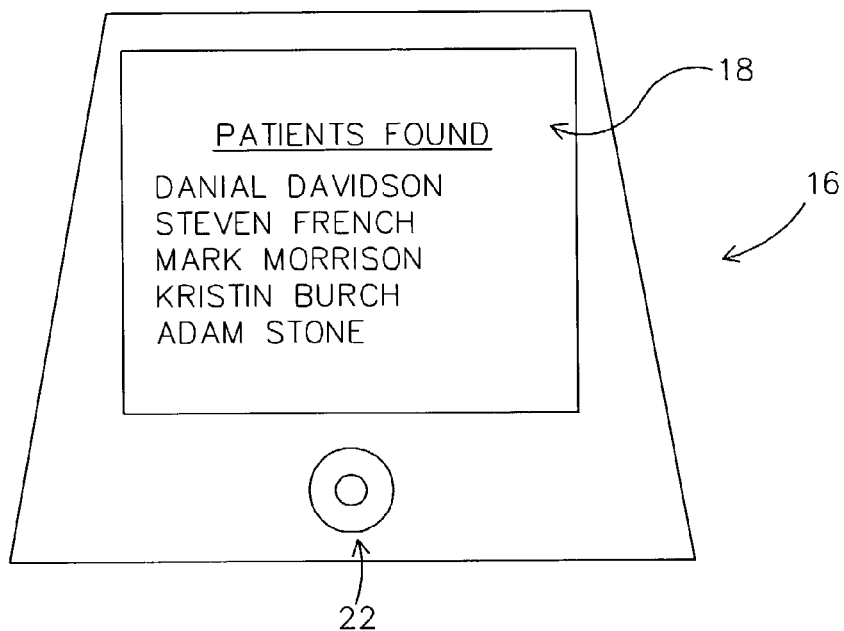
FIG. 4 is an illustration of one way that information may be listed on a display when more than one signal is detected.

FIG. 4 shows a display 18 displaying a list corresponding to more than one unique signal identifier as is preferable when more than one signal is detected. If more than one unique signal identifier is identified, the display preferably shows a list which represents which unique identifiers were identified. FIG. 4 shows an example in a hospital setting where the subjects of interest are hospital patients. The names of the patients are listed, and the user may then select a particular patient's data to review. Preferably, the patients' names are listed in order of strongest signal to weakest signal (hopefully representing closest patient to farthest patient). Alternatively, for passive identification devices, the patient's names are equally preferably listed in the order that signals are received after an interrogation signal is sent (hopefully representing closest patient to farthest patient based on how long it took the signal to travel back to the wireless detection unit after interrogation). Patients can also be listed by bed or room number, or some other identifier that would be useful in a hospital setting.

Figure 5:
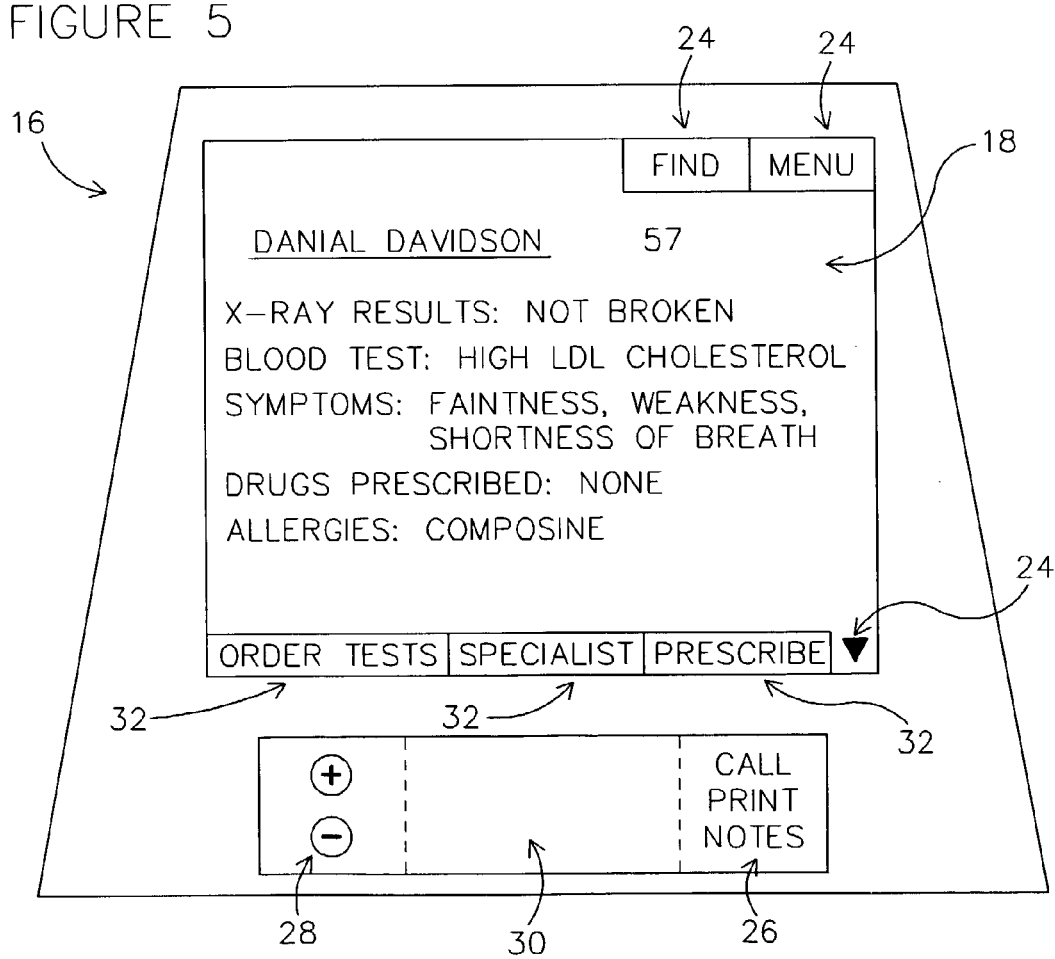
FIG. 5 is an illustration of one possible display of information relating to a patient and an illustration of some of the various controls that can be incorporated into one embodiment of the invention.

FIG. 5 shows an example of information being displayed. More specifically, FIG. 5 shows a display 18 that is displaying some patient data. The display 18 also has control options 24 that lead to system control functions. Control options 24 are options that appear on the display which allow a user to control the system. The control options 24 shown are 'find unique signals', 'menu', and 'more information'. Other examples of control options 24 include 'find data', 'find phone/pager numbers', 'scroll', 'decrease font size', 'display keyboard', and 'change form display of information'.

Also shown are activity controls 26. Activity controls 26 are controls that show up somewhere other than the display 18 that control some action. Activity controls 26 typically do not require further input by the user to initiate the action. The activity controls 26 shown are 'call number', 'print information', and 'access notes'. The activity controls 26 can either control fixed functions, or they can be assignable. Other examples of possible activity controls include 'find unique signals', 'access a category of information', 'display specialists', 'display other users associated with this subject of interest', etc.

Further, generic controls 28 and user input 30 are shown. Generic controls 28 can take on any function, and tend to be usable by multiple actions. For instance, the generic controls 28 shown would be used either to scroll through records or to change the value of a number category. The user input 30 allows a user to control and/or add data to the information displayed.

Finally, subject options 32 are displayed on the display 18 shown in FIG. 5. Subject options 32 are links related to the subject of interest that a user is more likely to use. The subject options 32 shown on display 18 are patient options; options related to a patient. The patient options shown include a link to order tests, to contact specialists, and to prescribe medication. Other subject options 32 would be useful in areas outside the patient care field. Also, the subject options may be caused to differ depending on the identity of the user. For instance, a shipping clerk may receive a 'send bill' subject option 32, whereas a nurse may receive a 'page treating physician' subject option 32.

Figure 6:
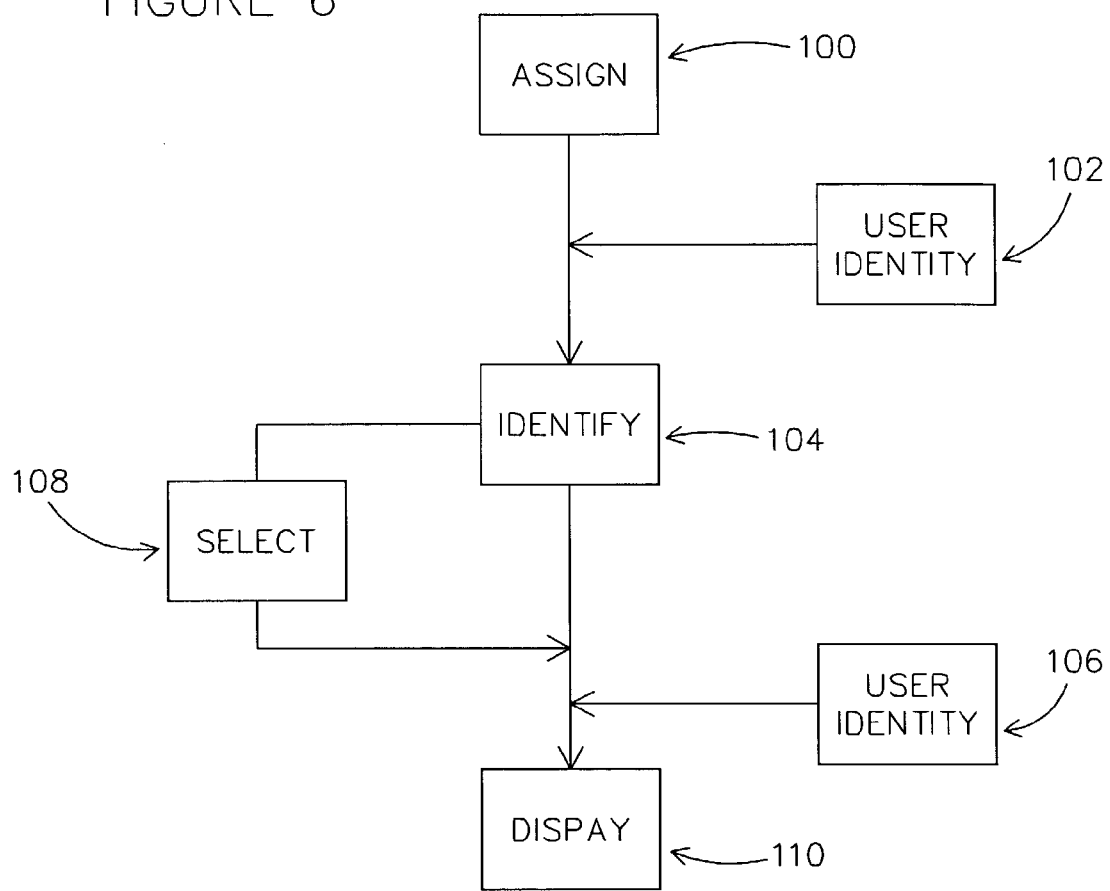
FIG. 6 is a flow chart showing the operation of the system for updating information about a subject of interest according to one embodiment of the invention.

FIG. 6 is a flow diagram according to one embodiment of the invention. Subjects of interest 10 are assigned unique signal identifiers at step 100. An identifier of the user, such as a password, may then be required at step 102. Including an identifier for the user allows an increase in patient confidentiality if the subject is a patient by limiting access to patient information. The unique signals are then identified at step 104 to associate the detected signal with a subject of interest 10. An identifier of the user may be required at step 106 before display of information is allowed. This is another time at which an identifier of the user may be required; the identifier may be the same as the first identifier and be satisfied if the first is inputted proximally in time, or it may be separate and distinct. Also, if more than one signal is identified, a user may need to select at step 108 which signal represents the subject of interest 10 about which the user intends to display information; more than one subject of interest 10 may be selected. Information may then be displayed 110. As mentioned earlier, the information accessible to be displayed may be different for different users. Also, the form of the display of information may be different for different users.

Examples of user identifiers at steps 102 and 106 other than passwords include the use of a smart card, a signal associated with the user, a magnetic coupling, or some other identification device or technique.

Figure 7:
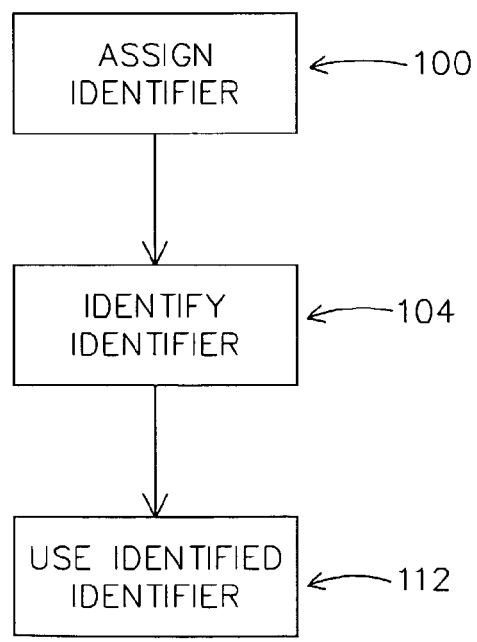
FIG. 7 is a flow chart showing the operation of a system that uses a wirelessly obtained patient identifier according to another embodiment of the invention.

FIG. 7 is another flow diagram according to another embodiment of the invention. Subjects of interest 10 are assigned at step 100 unique signal identifiers. The unique signals are then identified at step 104 to associate the detected signal with a subject of interest 10. Once the signals have been identified, the identified signals are used at step 112. Some possible uses for the identified signal include supplying patient information about a patient; correlating a test performed to a patient; supplying test information about a patient needed to run the test or calculate the results; and assigning a monitoring unit to a specific patient.

While the signal of the identification device 12 can use any wireless technology, it preferably uses a radio frequency (RF) signal for identification, such as a passive RF identification signal. More preferably, it uses Bluetooth™ technology, the Bluetooth trademark owned by Bluetooth SIG, Inc. Bluetooth wireless technology provides wireless connections; enabling links between mobile computers, mobile phones, portable handheld devices, and connectivity to the Internet. Bluetooth tends to have a low power consumption and a low cost.

The Bluetooth wireless specification includes both link layer and application layer definitions for product developers which supports data, voice and content-centric applications. Radios that comply with the Bluetooth™ wireless specification operate in the unlicensed, 2.4 GHz ISM (Industrial, Scientific and Medical) Band radio spectrum. These radios use a spread spectrum, frequency hopping, full-duplex signal at up to 1600 hops/sec. The signal hops among 79 frequencies at 1 MHz intervals to give a high degree of interference immunity. Bluetooth's synchronous bands are geared to carry relatively high-quality voice, while the asynchronous communication will support data at slightly more than 700 Kbps.

Distance for standard devices is limited to about 10 meters, but can be expanded to much larger distances (such as 100 meters) if desired. Once the devices are within the distance boundary, the devices can be connected automatically. It also provides a fast and secure transmission of voice and data even when the devices are not within line of sight.

Advanced error-correction methods, encryption and authentication routines are used to protect data for a user's privacy. Further, the technology provides a high transmission rate. The Bluetooth wireless technology supports both point-to-point and point-to-multipoint connections. Even though Bluetooth wireless protocol is currently preferred, other wireless systems and technologies may also be used.

Also, an identifier can be wirelessly and electronically detected from identification devices that do not generate a signal. For instance, an identifier may use a barcode that is detected by a detector using infrared or some other technology.

If a unique signal is used, the unique signal could be a unique wavelength, use a unique standard, or use some other method of wireless identification using a signal, but preferably means having a unique code coupled to a wireless signal. The unique identifier could be a consistent identifier for each device or could be changeable, such that when a different user has a device, the unique signal could be changed.

The present identification system need not only be used for displaying patient information. In a health care facility, the identification system could also be used to identify a patient for other purposes. For instance, the system could be used to identify a patient and then correlate the patient to monitoring or test results. The system could also be used to identify the patient in any number of other ways that a patient identification is needed in a health care setting.

The system may also be used to identify other health care facility articles such as a bedside monitor or other equipment. The identification of the device could then be associated with a patient, a room, a department, or some other grouping.

The invention has been described with reference to various specific and illustrative embodiments and techniques. However, it should be understood that many variations and modifications may be made while remaining within the spirit and scope of the invention. While much of the description has been directed to a hospital or other health care facility, other uses of the invention are possible.

What is claimed is:

1. A portable device for displaying information relating to a patient having a unique signal associated therewith, comprising:
    control logic that generates a control signal in response to a user actuated stimulus;
    a wireless signal detection unit capable of detecting the unique signal when the patient is in proximity to the wireless signal detection unit; and
    a display unit that displays information in response to the control signal, the information displayed associated with the signal detected by the wireless signal detection unit, wherein the display unit is configured such that the display unit can be associated with a particular user and the display unit can be configured to allow varying levels of access to information depending on the user, and the display unit further configured to display an alarm relating to the patient and that new information has become available since a medical record was checked.

2. The device of claim 1, wherein the control logic is prompted by a user actuated input device.

3. The device of claim 1, wherein the control signal causes the wireless signal detection unit to detect unique signals.

4. The device of claim 1, wherein the display unit is configured to display a list of choices when a plurality of unique signals are detected by the wireless signal detection unit.

5. The device of claim 1, wherein the display unit can be associated with a particular user, and the display only allows display of information corresponding to those unique signals associated with the particular user.

6. The device of claim 1, wherein the display unit is configured to display information relating to a subject of interest in response to a unique signal detected by the wireless signal detection unit if only one unique signal is detected.

7. The device of claim 1, wherein the display unit only allows display of information after a unique security input has been received.

8. The device of claim 1, further comprising an information supplier, the information supplier selected from the group consisting of a memory where information relating to at least one subject of interest is stored and a data connection that facilitates transfer of information relating to the subject of interest.

9. The device of claim 8, wherein the information supplier is a data connection, and the data connection is wireless.

10. The device of claim 1, wherein the information to be displayed includes patient data.

11. The device of claim 10, wherein the patient data is selected from the group consisting of the medical record, a medical chart, medical images, waveforms, lab results, and real-time patient monitoring results.

12. The device of claim 1, wherein a device incorporating the display unit is selected from a group consisting of a personal digital assistant, a pocket personal computer, and a tablet personal computer.

13. The device of claim 1, wherein the wireless signal detection unit detects a radio frequency.

14. The device of claim 1, wherein the display unit is configured such that the display unit can be associated with a particular user and the display unit can be configured to display data in different forms depending on the user.

15. A system for displaying information relating to a patient, comprising a detecting device and at least one information device;
    wherein the detecting device comprises a means for detecting a unique signal; a control that generates a control signal in response to an external stimulus; and a means for displaying information relating to the patient in response to the control signal; and
    wherein the identification device generates the unique signal associated therewith that can be detected by the wireless signal detection device wherein the displaying means is configured such that the displaying means can be identified with a particular user and the displaying means only allows display of a list corresponding to those unique signals identified with the particular user and the displaying means is further configured to display an alarm relating to the patient; and that new information has become available since a medical record was checked.

16. The system of claim 15, wherein the display unit displays information relating to the patient in response to a unique signal detected by the wireless signal detection unit if only one unique signal is detected.

17. A method of supplying information about a patient to a health care worker using a wireless detector, comprising:
    wirelessly identifying at least one patient when a unique signal associated with the patient is in a proximity of the wireless detector;
    displaying information relating to the patient in response to identifying the patient; and
    identifying the healthcare worker and regulating display of information based on the healthcare worker;
    wherein displaying information relating to the patient comprises:
    displaying an alarm relating to the patient; and
    displaying that new information has become available since the last time the medical record was checked.

18. The method of claim 17, further comprising displaying a list of patients if more than one patient is identified and allowing display of information relating to a patient if only one patient is identified.

19. The method of claim 17, further comprising displaying a list of patients associated with the healthcare worker if more than one patient associated with the health care worker is identified and allowing display of information relating to a patient if only one patient associated with the health care worker is identified.

20. The method of claim 17, wherein the information displayed includes patient data.

21. The method of claim 20, wherein the patient data comprises at least patient data selected from a group consisting of a medical record, a medical chart, medical images, waveforms, lab results, and real-time patient monitoring results.

22. The method of claim 21, wherein the patient data includes lab results and a medical chart.

23. The method of claim 17, wherein the unique signal is transmitted by a device physically associated with the patient.

24. The method of claim 17, further comprising assigning the patient a unique signal.

25. The method of claim 17, further comprising:
assigning a plurality of patients unique signals;
identifying a plurality of unique signals that are in proximity to the wireless detector;
generating a list of choices corresponding to the unique signals identified;
receiving a user input indicative of a selection of one or more of the choices; and
displaying information relating to the patient selected.

26. A control program for use with a wireless signal detection unit that detects a signal physically associated with a subject of interest when the subject of interest is in a proximity of the wireless signal detection unit, the control program comprising:
a control feature that allows a user to select that information associated with signals should be displayed;
an identification feature that identifies the signal associated with the subject of interest and identifies that the signal is associated with the subject of interest; and
a display feature that displays information related to the subject of interest in response to the identification feature wherein the display feature displays a list corresponding to more than one patient if more than one signal is identified by the identification feature and displays patient information if only one signal is identified by the identification feature wherein the list is ordered based on a value associated with a patient's distance from the portable electronic information viewing system.

27. A method for identifying a health care patient, comprising:
assigning the patient a unique identifier;
wirelessly and electronically identifying the unique identifier assigned to the patient;
using the identification of the unique identifier, wherein using the identification of the unique identifier includes displaying a medical chart for the patient on a display device based on the indentification of the unique identifier; and
associating the display device with a user, wherein displaying information on a display device comprises:
displaying information on the display device in a format based on the user associated with the display device;
displaying an alarm relating to the patient; and
displaying that new information that has become available since the last time the medical record was checked.

28. The method of claim 27, wherein the unique identifier is a unique signal.

29. The method of claim 28, wherein the unique signal uses a radio frequency to transmit the signal.

30. The method of claim 27, wherein using the identification of the unique identifier includes associating the patient with information based upon the unique signal identified.

31. The method of claim 30, wherein the information is selected from the group consisting of monitoring data and test data.

32. The method of claim 27, wherein displaying information on a display device comprises displaying different information on the display device based on a recent medical history of the patient.

33. The method of claim 27, wherein assigning the patient a unique identifier comprises assigning the patient to a room, wherein the room has a unique identifier.

34. The method of claim 33, wherein the unique identifier is a unique signal.

35. The method of claim 27, wherein assigning the patient a unique identifier comprises assigning the patient to a bed, wherein the bed has a unique identifier.

36. The method of claim 35, wherein the unique identifier is a unique signal.

37. The method of claim 27, further comprising physically associating an object carrying the unique identifier with the patient.

38. The method of claim 37, wherein the object is part of a room in a health care facility.

39. The method of claim 27, wherein using the identification of the unique identifier comprises assigning a monitor to the patient.

40. The method of claim 39, wherein the unique identifier is a radio frequency signal.

41. A method of providing a user with information about a patient using a portable electronic information viewing system, the method comprising:
determining that the portable electronic information viewing system is in proximity to the patient;
displaying information relating to the patient based on the determination; and
identifying the user and regulating display of information based on the user identified;
wherein displaying information relating to the patient comprises:
displaying an alarm relating to the patient; and
displaying that new information that has become available sine the last time the medical record was checked.

42. The method of claim 41, wherein determining that the portable electronic information viewing system is in proximity to the patient comprises determining that the portable electronic information viewing system is in proximity to a room to which the patient is assigned.

43. The method of claim 41, further comprising determining that the portable electronic information viewing system is in proximity to a plurality of patients.

44. The method of claim 43, further comprising displaying a list of patients to which the portable electronic information viewing system is in proximity.

45. The method of claim 44, further comprising displaying information relating to a patient listed on the list based on a user input indicative of a selection of the patient listed on the list.

46. The method of claim 44, wherein the list is ordered based on a value associated with a patient's distance from the portable electronic information viewing system.

47. The method of claim 41, further comprising identifying a user, wherein displaying information relating to the patient based on the determination comprises displaying the information in a format based on the user.

48. The method of claim 47, wherein identifying a user comprises identifying a user's job position.

49. The method of claim 47, wherein identifying a user comprises identifying a user's identity.

50. The method of claim 41, wherein determining that the portable electronic information viewing system is in proximity to the patient comprises receiving a unique signal identifier associated with the patient at the portable information viewing system, the unique identifier having been transmitted from an identification device located at or near the patient.

51. The method of claim 41, further comprising transferring data to the portable electronic information viewing system based on determining proximity, wherein displaying information comprises displaying the data.

52. The method of claim 41, wherein:
the method further comprises assigning the patient a unique signal; and
determining that the portable electronic information viewing system is in proximity to the patient comprises wirelessly identifying the unique signal.

53. The method of claim 52, wherein assigning the patient a unique signal comprises associating the unique signal with a code used by a health care facility to identify the patient's medical records.

54. The method of claim 52, wherein the unique signal comprises a code used by a health care facility to identify the patient's medical records in a form that is transferable by a radio frequency signal.

55. The method of claim 41, wherein regulating display of information comprises regulating access to patient data.

56. The method of claim 41, wherein displaying that new information has become available since the last time the medical record was checked comprises displaying that new information has become available since the last time the medical record was checked by a particular user.

57. The method of claim 41, further comprising providing a link to information related to the alarm.

58. The method of claim 41, further comprising providing a link to information related to the alarm.

59. The method of claim 41, further comprising displaying patient options relating to the patient based on the determination.

60. The method of claim 41, wherein determining that the portable electronic information viewing system is in proximity to the patient comprises using Bluetooth technology to determine that the portable electronic information viewing system is in proximity to the patient.

* * * * *